No. 810,921.  
PATENTED JAN. 30, 1906.  
A. DEWES.  
TIRE FOR VEHICLE WHEELS.  
APPLICATION FILED JULY 20, 1905.
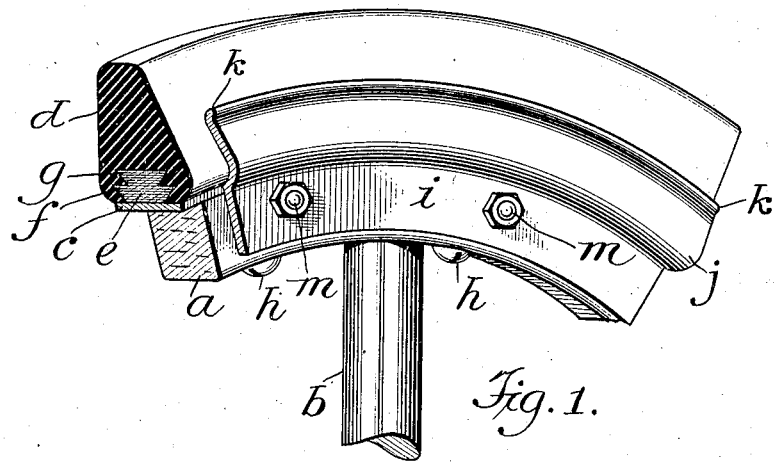
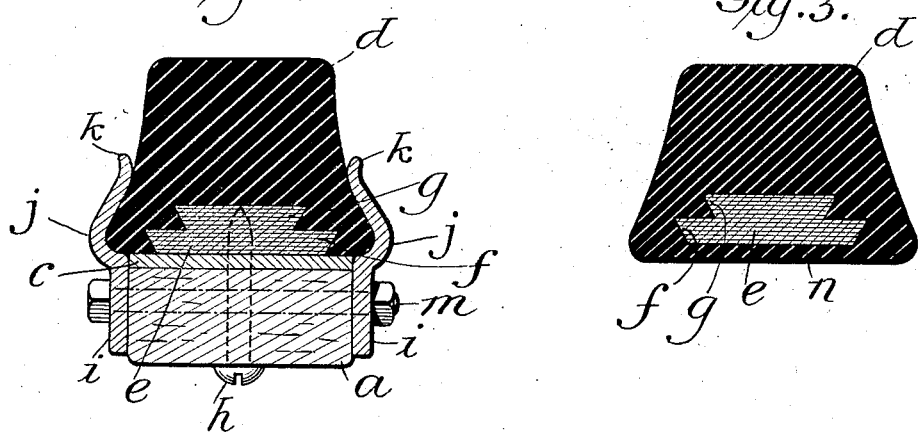
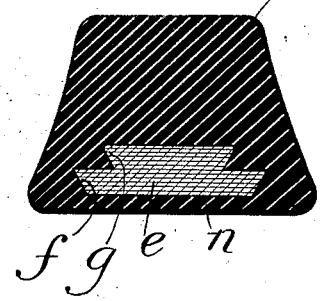
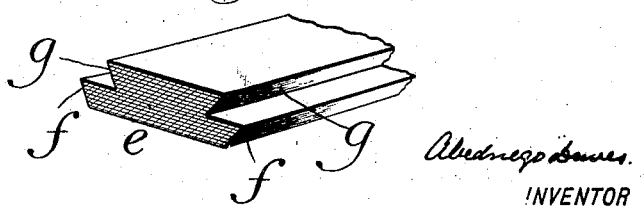

UNITED STATES PATENT OFFICE.

ABEDNEGO DEWES, OF NEW YORK, N. Y.

TIRE FOR VEHICLE-WHEELS.

No. 810,921. Specification of Letters Patent. Patented Jan. 30, 1906.

Application filed July 20, 1905. Serial No. 270,471.

*To all whom it may concern:*

Be it known that I, ABEDNEGO DEWES, a citizen of the United States, and a resident of New York, county of Kings, State of New York, have invented Improvements in Tires for Vehicle-Wheels, of which the following is a specification.

The solid flexible tire for vehicle-wheels forming the subject of this invention comprises a strip or core permanently embedded in the base portion or surface of the flexible body of the tire that seats on the periphery of the felly of the wheel, said strip or core being of a hard tough nature capable of intimate connection with the material of the tire as it is formed or molded around the core and submitted to a setting process, as by vulcanization. The strip or core is preferably composed of layers of canvas or other suitable fabric and a vulcanizable material compressed to such an extent as to afford a firm anchorage for screws, which, with the tire applied to a wheel, are passed through the felly and screwed into it, thereby firmly holding the flexible tire on the periphery of the felly. It is formed with a plurality of undercut recesses at each of its side edges, thereby providing two or more locking means at each side of the flexible tire for those portions thereof which lie between the undercut recesses of the core and the clamping-faces of side flanges which are secured to the sides of the felly by bolts or other suitable means and which are formed at their outer parts to extend beyond the periphery of the felly to embrace side extensions or beads formed at the lower parts of the flexible tire.

To describe the invention more particularly, reference will now be had to the accompanying drawings, in which—

Figure 1 is a perspective view of a part of a vehicle-wheel, showing this improved tire applied thereto. Fig. 2 is a transverse section of the same. Fig. 3 is a transverse section showing a modification of the arrangement of the retaining-core in the flexible tire, and Fig. 4 is a detached view of a double-lock retaining-core as made before it is applied to and vulcanized in the flexible tire.

The felly $a$, the spokes $b$, and the flat metal peripheral band $c$ of the wheel are of ordinary construction.

During the process of forming the flexible tire $d$ the retaining strip or core $e$, previously formed in the desired shape, is embedded therein, the nature of the materials comprised in the flexible tire and in the core being such that their contacting surfaces will become amalgamated or welded together during the setting or hardening process. The composition of the flexible tire $d$ is preferably, as is usual in this class of tires, of a nature adapted to be molded into form and set by vulcanization, and the strip or core $e$ is preferably made of layers of canvas or other suitable fabric cemented or held together by a vulcanizable composition solidly compressed and sufficiently vulcanized to retain its desired shape, but capable of intimate connection with the material of the tire $d$ as it is set or vulcanized in a suitable mold. The retaining strip or core $e$ may be made in suitable lengths to extend around or as sections within the flexible tire $d$, which will for most purposes be formed as a continuous ring.

The retaining-strip $e$ in cross-sections is preferably formed, as shown at Fig. 4, with a plurality of beveled or undercut recesses at its sides, two such undercut recesses $f f$ and $g g$ being shown and considered a suitable formation for the size and shape of tire illustrated.

Screws $h\ h$ are passed through the felly $a$ and band $c$ of the wheel and screwed into the core $e$, which by reason of its toughness, due to its construction, affords retentive grip for the screws to hold the tire against the felly or felly-band and prevent creeping action of the tire thereon. The contour of strip $e$ affords an extensive surface for connection with the material of the tire $d$ and also a plurality of locks at each side of the tire, as the distances between the clamping-faces of the side flanges and the inner parts of the recesses exceed the distances between the high or outer parts of said recesses and said clamping-faces of the side flanges.

The side flanges $i\ i$ are secured to the sides of the felly $a$ by bolts and nuts $m\ m$. They are formed to extend beyond the periphery of the felly with recessed portions $j$, which embrace and grip extension or beads formed on the sides of the tire $d$ at the lower part thereof, and their outer edges $k\ k$ are curved outwardly, as shown.

The tire $d$ with its permanently-connected retaining-core $e$ is made preferably so much wider than the felly $a$ that it will be compressed at its lower part by the side flanges $i$ when these flanges are seated firmly against the felly.

It will be understood that in this class of solid flexible tires used with side retaining-flanges a considerable portion of the tire lying within or between the flanges is what may be termed "dead material" and that the portion that is active or resilient under loads for the most part projects beyond the side flanges, and it is one of the aims of this invention to save or reduce the dead portion of the flexible tire as much as possible, the retaining-core $e$ being for that reason of such size as to replace so much of the flexible tire as not to detract its efficiency, and as the materials of which the retaining-core is made is much less expensive than that of the flexible tire a considerable saving in cost of manufacture is had.

For some purposes the retaining-core $e$ may be fully embedded in the flexible tire, with a narrow layer, as $n$, of the tire material beneath the core, as shown at Fig. 3, instead of being located at the base of the tire, as illustrated at Figs. 1 and 2.

I claim as my invention—

1. A solid tire for vehicle-wheels, composed of a flexible material, adapted to be seated on the periphery of a wheel-felly, and a retaining strip or core having a plurality of undercut recesses formed in each of its two side edges, embedded in the flexible material so as to be wholly within or above the base or seating portion of the flexible tire and adapted to receive the threaded portions of screws passed through the felly of the wheel.

2. A solid tire for vehicle-wheels, composed of a flexible material and a retaining-strip consisting of compacted layers of fabric and a vulcanizable material having a plurality of undercut recesses in each of its two edges, embedded in the base of the flexible material wholly within or above the seating-surface thereof and welded thereto by vulcanizing process, said retaining-strip being adapted to receive the threaded portions of holding-screws.

3. In combination, the felly of a wheel, a flexible tire adapted to seat on the periphery of the felly and having the lower parts of its sides formed to extend beyond the sides of the felly; a retaining strip or core with a plurality of undercut recesses at its sides embedded in the seating side of and welded by vulcanization to the flexible tire; side flanges adapted to grip the side extensions of the flexible tire; means for clamping the side flanges to the felly; and screws passed radially through the felly into the retaining strip or core of the flexible tire.

4. A solid flexible tire having embedded wholly within its lower or seating side a noncompressible retaining-strip formed with a plurality of undercut recesses in each of its side edges; a felly on which the flexible tire by its flat base is seated; and side flanges secured to the felly and shaped to clamp the sides of the flexible tire, the distance between the clamping-faces of the flanges and the outer points of the two or more undercut recesses on the two sides of the retaining-strip being less than the distances between said clamping-faces and the inner parts of said recesses.

In testimony whereof I have hereunto subscribed my name this 18th day of July, 1905.

ABEDNEGO DEWES.

Witnesses:
M. TURNER,
H. SCHWANK.